No. 11,934. Reissued Oct. 8, 1901.

L. WETZLER.

VEST.

(Application filed Feb. 28, 1900.)

Witnesses:—
Charles B. Mann Jr.
Charles L. Vietsch.

Inventor:—
Leo Wetzler
By Chas B. Mann
Attorney.

UNITED STATES PATENT OFFICE.

LEO WETZLER, OF BALTIMORE, MARYLAND, ASSIGNOR OF ONE-HALF TO EMANUEL J. BLIMLINE AND MOSES S. SONNEBORN, OF SAME PLACE.

VEST.

SPECIFICATION forming part of Reissued Letters Patent No. 11,934, dated October 8, 1901.

Original No. 614,068, dated November 8, 1898. Application for reissue filed February 28, 1900. Serial No. ,854.

*To all whom it may concern:*

Be it known that I, LEO WETZLER, of Baltimore, in the State of Maryland, have invented certain new and useful Improvements in Vests; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

This invention relates to an improved construction of vests for men's wear; and the object of the invention is to provide a reversible vest which when worn with one side out will appear as a double-breasted vest and when worn with the other side out will appear as a single-breasted vest.

The invention is illustrated in the accompanying drawings, in which—

Figure 1:
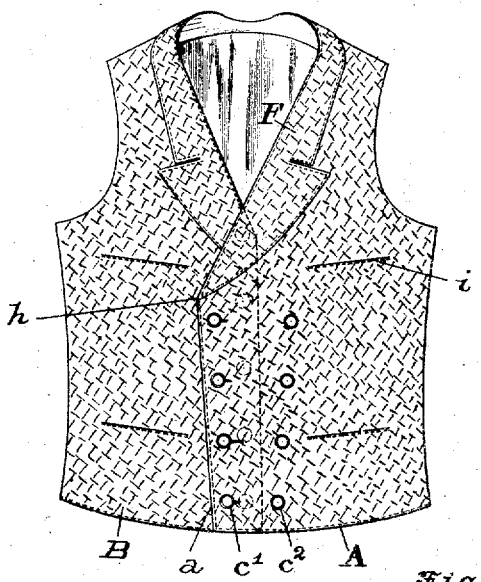
Figure 2:
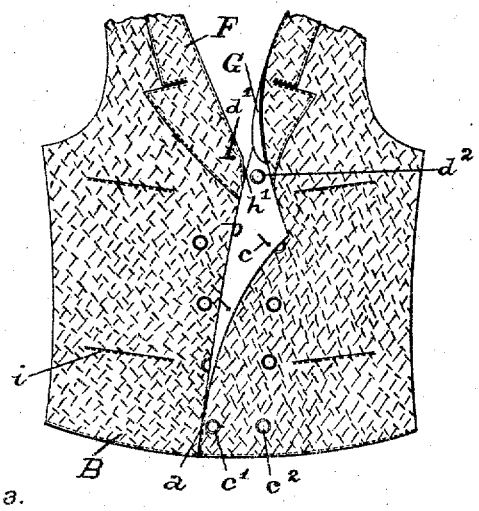
Figure 3:
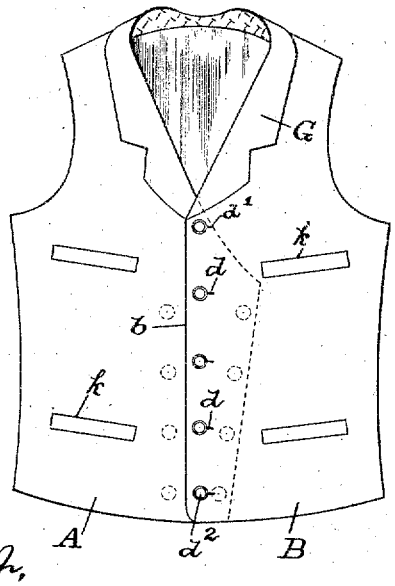

Figure 1 is a view of the vest with the double-breast exposure. Fig. 2 is a view broken at the neck and also showing the double-breast exposure, but partly unbuttoned to afford a slight view of the other side. Fig. 3 is a view of the vest with the single-breast exposure.

The two sides A B of the breast of the vest have buttonhole edges *a b*, respectively, of unequal length—that is, the buttonhole edge *a* of the double-breast side A is shorter than the edge *b* of the single-breast side B. The one has four buttonholes *c* and the other five buttonholes, four of which are marked *d* and the upper one *d'*. The spaces between the buttonholes on both edges are substantially equal. The vest shown has two distinct collars, that for the double breast being designated F and that for the single breast G. The double-breast collar F for the side A terminates in a gradual point *h* at its juncture with the buttonhole edge *a*; but for the other side B this collar has a vertical bevel end *h'* coincident with the buttonhole edge *b*, the gradual point, like the other side, being cut off on a vertical line. The buttonhole *d'* at the top of the long edge *b* also opens through the bevel end *h'* of the double-breast collar F. The side B of the breast has but one row of four buttons *c'*. The other side A of the breast has two rows of buttons, one row $c^2$ of four buttons, which is on the double-breast surface, and one row $d^2$ of five buttons, which is on the single-breast surface. The double-breast surface has pockets *i* and the single-breast surface pockets *k*.

It is obvious that the pattern or kind of cloth on one surface may be entirely different from that on the other.

When the double-breast surface is exposed to the exterior, as in Fig. 1, the uppermost button $d^2$, then on the inner surface, may engage the upper buttonhole *d'* at the top of the long edge *b*, first passing through the vertical bevel end *h'* of the collar F. This button and buttonhole come at the crossing-point where the outermost side of the double-breast collar F laps over the other side, and their engagement keeps these crossed parts in position.

By this construction of vest either side may be worn outermost and have either a double-breasted or a single-breasted effect.

The two distinct lapel-collars are not essential, and both may be omitted and the vest finished with a stitched edge, as vests frequently are.

Having thus described my invention, what I claim is—

1. A reversible vest having two finished surfaces and suitable buttons and buttonholes, the front of said vest consisting of a narrower side extending approximately to the middle thereof and a broader side extending beyond the middle, said vest having a single-breasted appearance when the narrower side overlaps the broader side, and a double-breasted appearance when the broader side overlaps the narrower side.

2. A reversible vest having two finished surfaces and adapted to be worn with either surface exposed, said vest having on one surface a symmetrical collar and a single row of buttons presenting a single-breasted appearance, and having on the other surface an unsymmetrical collar and two rows of buttons, presenting a double-breasted appearance, the front of said vest comprising two sides of different widths, each having a row of buttonholes.

3. The herein-described reversible vest having a buttonhole edge on one side of the breast shorter than the buttonhole edge on the other side of the breast, the breast with the shorter edge having two rows of buttons and the breast with the longer edge having one row of buttons, and one surface of the vest representing a double-breasted vest and the reverse surface representing a single-breasted vest.

In testimony whereof I affix my signature in presence of two witnesses.

LEO WETZLER.

Witnesses:

THOS. C. BAILEY,

CHARLES VIETSCH.